United States Patent
Blok et al.

(10) Patent No.: US 12,037,425 B2
(45) Date of Patent: Jul. 16, 2024

(54) PROPYLENE-BASED POLYMER ADDITIVES FOR IMPROVED TIRE TREAD PERFORMANCE

(71) Applicant: ExxonMobil Chemical Patents Inc., Baytown, TX (US)

(72) Inventors: Edward J. Blok, Huffman, TX (US); Anthony J. Dias, Houston, TX (US); Gabor Kiss, Hampton, NJ (US); Paul T. Q. Nguyen, League City, TX (US)

(73) Assignee: ExxonMobil Engineering & Technology Company, Baytown, TX (US)

( * ) Notice: Subject to any disclaimer, the term of this patent is extended or adjusted under 35 U.S.C. 154(b) by 254 days.

(21) Appl. No.: 17/043,235

(22) PCT Filed: Apr. 9, 2019

(86) PCT No.: PCT/US2019/026589
§ 371 (c)(1),
(2) Date: Sep. 29, 2020

(87) PCT Pub. No.: WO2019/199833
PCT Pub. Date: Oct. 17, 2019

(65) Prior Publication Data
US 2021/0024668 A1  Jan. 28, 2021

Related U.S. Application Data

(60) Provisional application No. 62/655,972, filed on Apr. 11, 2018.

(51) Int. Cl.
| | | |
|---|---|---|
| *C08F 210/06* | (2006.01) | |
| *B60C 1/00* | (2006.01) | |
| *C08K 3/04* | (2006.01) | |
| *C08K 3/06* | (2006.01) | |
| *C08K 3/22* | (2006.01) | |
| *C08K 5/09* | (2006.01) | |
| *C08K 5/17* | (2006.01) | |
| *C08L 9/06* | (2006.01) | |

(52) U.S. Cl.
CPC .......... *C08F 210/06* (2013.01); *B60C 1/0016* (2013.01); *C08K 3/04* (2013.01); *C08K 3/06* (2013.01); *C08K 3/22* (2013.01); *C08K 5/09* (2013.01); *C08K 5/17* (2013.01); *C08L 9/06* (2013.01); *C08K 2003/2296* (2013.01)

(58) Field of Classification Search
CPC ....... C08F 210/06; B60C 1/0016; C08K 3/04; C08K 3/06; C08K 3/22; C08K 5/09; C08K 5/17; C08K 2003/2296; C08K 3/36; C08K 5/18; C08K 5/31; C08K 5/47; C08K 5/548; C08L 9/06; C08L 23/16; C08L 79/04; C08L 9/00; C08L 91/00; A61F 2/2409; A61F 2/2412; A61F 2/2421; A61F 2/2424; A61F 2250/0013; A61N 1/36117; A61N 1/36514; A61N 1/36521; A61N 1/36528; A61N 1/36564; A61N 1/36571; A61N 1/36578; A61N 1/36585; A61N 1/3682; A61N 1/3684; A61N 1/36842; A61N 1/36843
USPC ........................................................ 524/255
See application file for complete search history.

(56) References Cited

U.S. PATENT DOCUMENTS

| | | |
|---|---|---|
| 8,501,894 B2 | 8/2013 | Crowther et al. |
| 8,835,563 B2 | 9/2014 | Crowther et al. |
| 9,273,163 B2 | 3/2016 | Crowther et al. |
| 9,527,993 B2 | 12/2016 | Duc et al. |
| 2013/0274404 A1 | 10/2013 | Vasseur |

FOREIGN PATENT DOCUMENTS

| | | |
|---|---|---|
| EP | 3208107 | 8/2017 |
| WO | 2016/053541 | 4/2016 |
| WO | 2019/199835 | 10/2019 |
| WO | 2019/199839 | 10/2019 |
| WO | 2019/199840 | 10/2019 |

*Primary Examiner* — Frances Tischler

(57) ABSTRACT

An elastomeric composition is disclosed. The elastomeric composition includes, per 100 parts by weight of rubber (phr): about 0 to about 25 phr of poly butadiene having a cis-1,4 linkage content of at least 95%; about 75 to 100 phr of a styrene/butadiene copolymer; about 10 to about 30 phr of a processing oil; about 50 to about 70 phr of a filler; a curative agent; an antioxidant; a silane coupling agent; and about 5 to about 30 phr of a propylene-ethylene-diene terpolymer.

20 Claims, No Drawings

PROPYLENE-BASED POLYMER ADDITIVES FOR IMPROVED TIRE TREAD PERFORMANCE

CROSS-REFERENCE TO RELATED APPLICATIONS

This application is a U.S. national phase application of PCT application No. PCT/US2019/026589 having a filing date of Apr. 9, 2019, which claims priority to and the benefit of U.S. provisional application Ser. No. 62/655,972 having a filing date of Apr. 11, 2018, the contents of both of which are incorporated by reference in their entirety.

FIELD OF THE INVENTION

The present invention relates to propylene-ethylene-diene terpolymers useful as modifiers for tire treads.

BACKGROUND OF THE INVENTION

The tire tread compound is an important compound in a tire that dictates wear, traction, and rolling resistance. It is a technical challenge to deliver excellent traction, low rolling resistance while providing good tread wear. The challenge lies in the trade-off between wet traction and rolling resistance/tread wear. Raising the compound glass transition temperature (Tg) would provide better wet traction but, at the same time, increase the rolling resistance and tread wear. There are needs to develop a tread compound additive that can provide good wet traction without increasing the rolling resistance and tread wear.

Functionalized SBR (styrene butadiene rubber) is one method to improve this trade-off by improving filler dispersion. NANOPRENE™, sub-micron to micron sized gels from Lanxess with cross-linked butadiene cores and acrylic shells, is another additive used to increase the wet traction without affecting rolling resistance. However, Nanoprene can only deliver limited improvement in wet traction.

Related references include U.S. Pat. Nos. 8,835,563; 8,501,894; 9,527,993; and 9,273,163.

SUMMARY OF THE INVENTION

Described herein is an elastomeric composition comprising, per 100 parts by weight of rubber (phr): about 0 to about 25 phr of polybutadiene having a cis-1,4 linkage content of at least 95%; about 75 to 100 phr of a styrene/butadiene copolymer; about 10 to about 30 phr of a processing oil; about 50 to about 70 phr of a filler; a curative agent; an antioxidant; a same coupling agent; and about 5 to about 30 phr of a propylene-ethylene-diene terpolymer.

Also disclosed is a method of balancing the wet traction performance and rolling resistance in a tire tread comprising combining at least a filler, polybutadiene, a styrene/butadiene copolymer, and a curative agent with one or more propylene-ethylene-diene terpolymers to form a tire tread; and effecting a cure of the components to form a tire tread; wherein the level of the propylene-ethylene-diene terpolymer(s) relative to the other components, and its comonomer content, can be varied to improve the balance of wet traction and rolling resistance of a tire tread.

DETAILED DESCRIPTION OF THE INVENTION

This invention is directed to the use of propylene-ethylene-diene terpolymers in tire tread compositions. The propylene-ethylene-diene terpolymers are prepared by polymerizing (i) propylene with (ii) at least one of ethylene and $C_4$-$C_{20}$ α-olefins and (iii) one or more dienes such as ethylidene norbornene.

The tire tread composition is an important aspect in a tire that dictates wear, traction, and rolling resistance. It is a technical challenge to deliver excellent traction and low rolling resistance while providing good tread wear. The challenge lies in the trade-off between wet traction and rolling resistance/tread wear. Typically, raising the composition's glass transition temperature (Tg) would provide good wet traction but, at the same time, increase the rolling resistance and tread wear. The embodiments described herein, on the other hand, provide a tread compound additive that can deliver superior wet traction without lowering the rolling resistance and tread wear.

The problem has been approached by developing an additive, a propylene-ethylene-diene terpolymer that increases hysteresis in the wet traction region (0° C.) and lowers hysteresis in the rolling resistance region (60° C.) without changing the overall compound Tg.

The additive compounding step allows one to address the known deficiencies of polyolefin blends with styrene-butadiene rubber/polybutadiene/natural rubber (SBR/PBD/NR) compositions by concentrating the carbon black and antioxidant in the polyolefin domain to improve abrasion resistance, cure state and UV stability. These deficiencies include poorly vulcanized and poorly reinforced polyolefin domains as curatives and fillers migrate away from the polyolefin due to unfavorable solubility parameter differences. The present embodiments described herein overcome one or more of these deficiencies.

Further, the tread compositions described herein is suitable for use in summer tires typically used by high-performance vehicles. That is, the mechanical properties of the tread compounds indicate that corresponding tires would have enhanced handling greater traction and grip) and improved braking capabilities.

Propylene-Ethylene-Diene Terpolymer

The "propylene-ethylene-diene terpolymer" as used herein may be any polymer comprising propylene and other comonomers. The term "polymer" refers to any carbon-containing compound having repeat units from one or more different monomers. The term "terpolymer" as used herein refers to a polymer synthesized from three different monomers. Terpolymers, in some embodiments, may be produced (1) by mixing all three monomers at the same time or (2) by sequential introduction of the different comonomers. The mixing of comonomers may be done in one, two, or possible three different reactors in series and/or in parallel. Preferably the propylene-ethyl ene-diene terpolymer comprises (i) propylene-derived units, (ii) α-olefin-derived units and (iii) diene-derived units. The propylene-ethylene-diene terpolymer may be prepared by polymerizing (i) propylene with (ii) at least one of ethylene and $C_4$-$C_{20}$ α-olefins and (iii) one or more dienes.

The comonomers may be linear or branched. Preferred linear comonomers include ethylene or $C_4$ to $C_8$ α-olefins, more preferably ethylene, 1-butene, 1-hexene, and 1-octene, even more preferably ethylene or 1-butene. Preferred branched comonomers include 4-methyl-1-pentene, 3-methyl-1-pentene, and 3,5,5-trimethyl-1-hexene. In one or more embodiments, the comonomers may include styrene.

The dienes may be conjugated or non-conjugated. Preferably, the dienes are non-conjugated. Illustrative dienes may include, but are not limited to, 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD); and combinations thereof. Preferably, the diene is ENB or VNB. Preferably, the propylene-ethylene-diene terpolymer comprises an ENB content of from 1 wt % to 8 wt % based on the weight of the terpolymer, or from 2 wt % to 6 wt %, or from 3 wt % to 5 wt %.

The propylene-ethylene-diene terpolymer may have a propylene amount of from 65 wt % to 95 wt %, or from 70 wt % to 95 wt %, or from 75 wt % to 95 wt %, or from 80 wt % to 95 wt %, or from 83 wt % to 95 wt %, or from 84 wt % to 95 wt %, or from 84 wt % to 94 wt %, or from 72 wt % to 95 wt %, or from 80 wt % to 93 wt %, or from 85 wt % to 89 wt %, based on the weight of the polymer. The balance of the propylene-ethylene-diene terpolymer comprises at least one of ethylene and $C_4$-$C_{20}$ α-olefin and one or more dienes. The α-olefin may be ethylene, butene, hexane, or octene. When two or more α-olefins are present in the polymer, ethylene and at least one of butene, hexane, or octene are preferred.

Preferably, the propylene-ethylene-diene terpolymer comprises from 2 to 30 wt % of $C_2$ and/or $C_4$-$C_{20}$ α-olefins based the weight of the propylene-ethylene-diene terpolymer. When two or more of ethylene and $C_4$-$C_{20}$ α-olefins are present the combined amounts of these olefins in the polymer is preferably at least 2 wt % and falling within the ranges described herein. Other preferred ranges of the amount of ethylene and/or one or more α-olefins include from 2 wt % to 15 wt %, or from 5 wt % to 15 wt %, or from 8 wt % to 15 wt %, or from 8 to 12 wt %, based on the weight of the propylene-ethylene-diene terpolymer.

Preferably, the propylene-ethylene-diene terpolymer comprises an ethylene content of from 5 wt % to 25 wt % based on the weight of the terpolymer, or from 8 wt % to 12 wt %.

Preferably, the propylene-ethylene-diene terpolymer comprises a diene content of from 1 wt % to 16 wt % based on the weight of the terpolymer, or from 1 wt % to 12 wt %, or 2 wt % to 6 wt %, or from 2 wt % to 6 wt %.

The propylene-ethylene-diene terpolymer may have a melt flow rate (MFR, 2.16 kg weight at 230° C.), equal to or greater than 0.1 g/10 min as measured according to the ASTM D-1238-13. Preferably, the MFR (2.16 kg at 230° C.) is from 0.5 g/10 min to 200 g/10 min, or from 0.5 g/10 min to 100 g/10 min, or from 0.5 g/10 min to 30 g/10 min, or from 0.5 g/10 min to 10 g/10 min, or from 0.5 g/10 min to 5 g/10 min, or from 0.5 g/10 min to 2 g/10 min, or from 0.1 g/10 min to 15 g/10 min.

The propylene-ethylene-diene terpolymer may have a heat of fusion ($H_f$) determined by the DSC procedure described herein, which is greater than or equal to 0 Joules per gram (J/g), and is equal to or less than 80 J/g, or equal to or less than 75 J/g, or equal to or less than 70 J/g, or equal to or less than 60 J/g, or equal to or less than 50 J/g, or equal to or less than 35 J/g. Preferably, the Hf is 0 J/g.

The crystallinity of the propylene-ethylene-diene terpolymer may be expressed in terms of percentage of crystallinity (i.e., % crystallinity), as determined according to the DSC procedure described herein. The propylene-ethylene-diene terpolymer may have a % crystallinity of from 0% to 40%. Preferably, the % crystallinity is 0%. The propylene-ethylene-diene terpolymer preferably may have a single broad melting transition. However, the propylene-ethylene-diene terpolymer may show secondary melting peaks adjacent to the principal peak, but for purposes herein, such secondary melting peaks are considered together as a single melting point, with the highest of these peaks (relative to baseline as described herein) being considered as the melting point of the propylene-ethylene-diene terpolymer.

The Differential Scanning calorimetry (DSC) procedure may be used to determine heat of fusion and melting temperature of the propylene-ethylene-diene terpolymer. The method is as follows: approximately 6 mg of material placed in microliter aluminum sample pan. The sample is placed in a Differential Scanning calorimeter (Perkin Elmer Pyris 1 Thermal Analysis System) and is cooled to −80° C. The sample is heated at 10° C./min to attain a final temperature of 120° C. The sample is cycled twice. The thermal output, recorded as the area under the melting peak of the sample, is a measure of the heat of fusion and may be expressed in Joules per gram of polymer and is automatically calculated by the Perkin Elmer System. The melting point is recorded as the temperature of the greatest heat absorption within the range of melting of the sample relative to a baseline measurement for the increasing heat capacity of the polymer as a function of temperature.

The propylene-ethylene-diene terpolymer may be a blend of discrete random propylene-ethylene-diene terpolymers as long as the polymer blend has the properties of the propylene-ethylene-diene terpolymer as described herein. The number of propylene-ethylene-diene terpolymers may be three or less, or two or less. In one or more embodiments, the propylene-ethylene-diene terpolymer may include a blend of two propylene-ethylene-diene terpolymers differing in the olefin content, the diene content, or the both.

The inventive compositions may include the propylene-ethylene-diene terpolymer in an amount of from 5 phr to 40 phr, or from 5 phr to 25 phr, or from 10 phr to 20 phr.

Elastomers

The inventive tire tread compositions also comprise an elastomer. Generally the range of the elastomer is from 5 to 75% by weight of the tire tread composition. Suitable elastomers include, for example, diene elastomers.

"Diene elastomer" is understood to mean, in known manner, an elastomer resulting at least in part (homopolymer or copolymer) from diene monomers (monomers bearing two double carbon-carbon bonds, whether conjugated or not).

A diene elastomer can be "highly unsaturated," resulting from conjugated diene monomers, which have a greater than 50% molar content of units.

According to one aspect, each diene elastomer having a Tg from −75° C. to 0° C. is selected from the group consisting of styrene butadiene copolymers, natural polyisoprenes, synthetic polyisoprenes having a cis-1,4 linkage content greater than 95%, styrene/butadiene/isoprene terpolymers and a mixture of these elastomers, and each diene elastomer having a Tg from −110° C. to −75° C., preferably from −100° C. to −80° C., is selected from the group consisting of polybutadienes having a cis-1,4 linkage content greater than 90% and isoprene/butadiene copolymers comprising butadiene units in an amount equal to or greater than 50%.

In another aspect, each diene elastomer having a Tg from −75° C. to 0° C. is selected from the group consisting of natural polyisoprenes and synthetic polyisoprenes having a cis-1,4 linkage content greater than 95%, and each diene elastomer having a Tg from −110° C. to −75° C. is a polybutadiene having a cis-1,4 linkage content greater than 90%, or greater than 95%.

In one aspect, the composition comprises a blend of at least one of the polybutadienes having a cis-1,4 linkage content greater than 90% with at least one of the natural or synthetic polyisoprenes (having a cis-1,4 linkage content greater than 95%).

In another aspect, the composition comprises a blend of at least one of the polybutadienes having a cis-1,4 linkage content greater than 90% with at least one of the terpolymers of styrene, isoprene and butadiene.

In another aspect, the composition comprises a blend of a polybutadiene and a styrene-butadiene rubber component.

These diene elastomers can be classified into two categories: "essentially unsaturated" or "essentially saturated". The term "essentially unsaturated" is understood to mean generally a diene elastomer resulting at least in part from conjugated diene monomers having a level of units of diene origin (conjugated dienes) which is greater than 15% (mol %); thus it is that diene elastomers such as butyl rubbers or copolymers of dienes and of alpha-olefins of EPDM type do not come within the preceding definition and can in particular be described as "essentially saturated" diene elastomers (low or very low level of units of diene origin, always less than 15%). In the category of "essentially unsaturated" diene elastomers, the term "highly unsaturated" diene elastomer is understood to mean in particular a diene elastomer having a level of units of diene origin (conjugated dienes) which is greater than 50%.

Given these definitions, the term diene elastomer capable of being used herein is understood more particularly to mean: (a) any homopolymer obtained by polymerization of a conjugated diene monomer having from 4 to 12 carbon atoms; (b) any copolymer obtained by copolymerization of one or more conjugated dienes with one another or with one or more vinylaromatic compounds having from 8 to 20 carbon atoms; (c) a ternary copolymer obtained by copolymerization of ethylene and of an alpha-olefin having 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene; (d) a copolymer of isobutene and of isoprene (butyl rubber) and also the halogenated versions, in particular chlorinated or brominated versions, of this type of copolymer.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyl toluene" commercial mixture, para-(tert-butyl)styrene, methoxystyrenes, chlorostyrenes, vinylmesitylene, divinylbenzene or vinylnaphthalene.

The copolymers can comprise from 99% to 20% by weight of diene units and from 1% to 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or also functionalized with a coupling and/or star-branching or functionalization agent. Mention may be made, for coupling to carbon black, for example, of functional groups comprising a C—Sn bond or aminated functional groups, such as benzophenone, for example; mention may be made, for coupling to a reinforcing inorganic filler, such as silica, of, for example, silanol or polysiloxane functional groups having a silanol ends, alkoxysilane groups, carboxyl groups, or polyether groups.

The following are suitable: polybutadienes, in particular those having a content (molar %) of 1,2-units of from 4% to 80% or those having a content (molar %) of cis-1,4-units of greater than 80%, polyisoprenes, butadiene/styrene: copolymers, a styrene content of from 5% to 60% by weight and more particularly from 20% to 50%, a content (molar %) of 1,2-bonds of the butadiene part of from 4% to 75% and a content (molar %) of trans-1,4-bonds of from 10% to 80%, butadiene/isoprene copolymers, in particular those having an isoprene content of from 5% to 90% by weight, or isoprene/styrene copolymers, in particular those having a styrene content of from 5% to 50% by weight. In the case of butadiene/styrene/isoprene copolymers, those having a styrene content of from 5% to 50% by weight and more particularly of from 10% to 40%, an isoprene content of from 15% to 60% by weight and more particularly from 20% to 50%, a butadiene content of from 5% to 50% by weight and more particularly of from 20% to 40%, a content (molar %) of 1,2-units of the butadiene part of from 4% to 85%, a content (molar %) of trans-1,4-units of the butadiene part of from 6% to 80%, a content (molar %) of 1,2-plus 3,4-units of the isoprene part of from 5% to 70% and a content (molar %) of trans-1,4-units of the isoprene part of from 10% to 50%, and more generally any butadiene/styrene/isoprene copolymer.

The diene elastomer chosen from the group of the highly unsaturated diene elastomers consisting of polybutadienes (abbreviated to "BR"), synthetic polyisoprenes (IR), natural rubber (NR), butadiene copolymers, isoprene copolymers and the mixtures of these elastomers. Such copolymers are more preferably chosen from the group consisting of butadiene/styrene copolymers (SBR), isoprene/butadiene copolymers (BIR), isoprene styrene copolymers (SIR) and isoprene/butadiene/styrene copolymers (SBIR).

According to a specific embodiment, the diene elastomer is predominantly (i.e., for more than 50 wt %) an SBR, whether an SBR prepared in emulsion ("ESBR") or an SBR prepared in solution ("SSBR"), or an SBR/BR, SBR/NR (or SBR/IR), BR/NR (or BR/IR) or also SBR/BR/NR (or SBR/BR/IR) blend (mixture). In the case of an SBR (ESBR or SSBR) elastomer, use is made in particular of an SBR having a moderate styrene content, for example of from 20% to 35% by weight, or a high styrene content, for example from 35 to 45%, a content of vinyl bonds of the butadiene part of from 15% to 70%, a content (molar %) of trans-1, 4-bonds of from 15% to 75%, such an SBR can advantageously be used as a mixture with a BR preferably having more than 90% (molar %) of cis-1,4-bonds.

The term "isoprene elastomer" understood to mean, in a known way, an isoprene homopolymer or copolymer, in other words a diene elastomer chosen from the group consisting of natural rubber (NR), synthetic polyisoprenes (IR), the various copolymers of isoprene and the mixtures of these elastomers. Mention will in particular be made, among isoprene copolymers, of isobutene/isoprene copolymers (butyl rubber IM), isoprene/styrene copolymers (SIR), isoprene/butadiene copolymers (BIR) or isoprene/butadiene/styrene copolymers (SBIR). This isoprene elastomer is preferably natural rubber or a synthetic cis-1,4-polyisoprene; use is preferably made, among these synthetic polyisoprenes, of the polyisoprenes having a level (molar %) of cis-1,4-bonds of greater than 90%, more preferably still of greater than 98%.

According to still another aspect, the rubber composition comprises a blend of a (one or more) "high Tg" diene elastomer exhibiting a Tg of from −70° C. to 0° C. and of a (one or more) "low Tg" diene elastomer exhibiting a Tg of from −110° C. to −80° C., more preferably from −100° C. to −90° C. The high Tg elastomer is preferably chosen from the group consisting of S-SBRs, E-SBRs, natural rubber, synthetic polyisoprenes (exhibiting a level (molar %) of cis-1, 4-structures preferably of greater than 95%), BIRs, SIRs, SBIRs and the mixtures of these elastomers. The low Tg elastomer preferably comprises butadiene units according to a level (molar %) at least equal to 70%; it preferably consists of a polybutadiene (BR) exhibiting a level (molar %) of cis-1,4-structures of greater than 90%.

According to another embodiment of the invention, the rubber composition comprises, for example, from 30 to 100 phr, in particular from 50 to 100 phr, or from 75 to 100 phr (parts by weight per hundred parts of total elastomer), of a high Tg elastomer as a blend with 0 to 50 phr, in particular from 0 to 25 phr, of a low Tg elastomer; according to another example, it comprises, for the whole of the 100 phr, one or more SBR(s) prepared in solution.

According to another embodiment of the invention, the diene elastomer of the composition according to the invention comprises a blend of a BR (as low Tg elastomer) exhibiting a level (molar %) of cis-1,4-structures of greater than 90% with one or more S-SBRs or E-SBRs (as high Tg elastomer(s)).

The compositions described herein can comprise a single diene elastomer or a mixture of several diene elastomers, it being possible for the diene elastomer or elastomers to be used in combination with any type of synthetic elastomer other than a diene elastomer, indeed even with polymers other than elastomers, for example thermoplastic polymers.

Although any styrenic copolymer is useful, those most desirable in the tire compositions are styrene-butadiene copolymer "rubbers." Such rubbers preferably have from 10 or 15 or 20 wt % to 30 or 25 or 40 wt % styrene derived units, by weight of the block copolymer, and within the range of from 30 or 40 or 45 wt % to 55 or 60 or 65 wt % vinyl groups.

Useful tire tread compositions can also comprise 15 to 50 or 60 wt % of a styrenic copolymer; 0 or 5 wt % to 60 wt % of a polybutadiene polymer; 0 to 60 wt % of natural rubber or synthetic polyisoprene; 15 to 50 or 60 wt % of a functionalized styrenic copolymer; 0 or 5 wt % to 60 wt % of a functionalized polar polybutadiene polymer; 0 or 5 wt % to 60 wt % of natural rubber or functionalized synthetic polyisoprene; 0 or 5 wt % to 20 or 40 wt % of processing oil; 20 wt % to 60 wt % of filler, especially silica-based filler as described herein; a curative agent; and 5 wt % to 20 wt % of a propylene-ethylene-diene terpolymer described herein, and 0 or 5 wt % to 40 wt % of a hydrocarbon resin, the weight percentages based on the total composition.

Inorganic Filler

The term "filler" as used herein refers to any material that is used to reinforce or modify physical properties, impart certain processing properties, or reduce cost of an elastomeric composition.

Examples of preferred filler include, but are not limited to, calcium carbonate, clay, mica, silica, silicates, talc, titanium dioxide, alumina, zinc oxide, starch, wood flour, carbon black, or mixtures thereof. The fillers may be any size and range, for example in the tire industry, from 0.0001 μm to 100 μm.

As used herein, the term "silica" is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica. A preferred filler is commercially available by Rhodia Company under the trade name ZEOSIL™ 21165.

Use may be made of any type of reinforcing filler known for its capabilities of reinforcing a rubber composition which can be used for the manufacture of tires, for example an organic filler, such as carbon black, a reinforcing inorganic filler, such as silica, or a blend of these two types of filler, in particular a blend of carbon black and silica.

All carbon blacks, in particular blacks of the HAF, ISAF or SAF type, conventionally used in tires ("tire-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or also, depending on the applications targeted, the blacks of higher series (for example, N660, N683 or N772). The carbon blacks might, for example, be already incorporated in the isoprene elastomer in the form of a masterbatch (see, for example, International Applications WO 97/36724 or WO 99/16600).

The term "reinforcing inorganic filler" should be understood, in the present patent application, by definition, as meaning any inorganic or mineral filler, whatever its color and its origin (natural or synthetic), also known as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, the term reinforcing inorganic filler is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or pyrogenic silica exhibiting a BET surface and a CTAB specific surface both of less than 450 $m^2/g$, preferably from 30 to 400 $m^2/g$. Mention will be made, as highly dispersible ("HDS") precipitated silicas, for example, of the ULTRA-SIL™ 7000 and ULTRASIL™ 7005 silicas from Degussa, the ZEOSIL™ 1165 MP, C5 MP and 1115 MP silicas from Rhodia, the HI-SIL™ EZ150G silica from PPG, the Zeopol 8715, 8745 and 8755 silicas from Huber or silicas with a high specific surface.

Mention may also be made, as other examples of inorganic filler being capable of being used, of reinforcing aluminum (oxide), hydroxides, titanium oxides or silicon carbides (see, for example, International Application No. WO 2/053634 or U.S. Publication No. 2004/0030017).

When the compositions of the invention are intended for tire treads with a low rolling resistance, the reinforcing inorganic filler used, in particular if it is silica, preferably has a BET surface of from 45 to 400 m²/g, more preferably of from 60 to 300 m²/g.

Preferably, the level of total reinforcing filler (carbon black and/or reinforcing inorganic filler) is from 20 to 200 phr, more preferably from 30 to 150 phr, the optimum being in a known way different depending on the specific applications targeted: the level of the reinforcement expected with regard to a bicycle tire, for example, is, of course, less than that required with regard to a tire capable of running at high speed in a sustained manner, for example, a motor cycle tire, a tire for a passenger vehicle or a tire for a commercial vehicle, such as a heavy duty vehicle.

Coupling Agent

As used herein, the term "coupling agent" is meant to refer to any agent capable of facilitating stable chemical and/or physical interaction between two otherwise non-interacting species, e.g., between a filler and a diene elastomer. Coupling agents cause silica to have a reinforcing effect on the rubber. Such coupling agents may be pre-mixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

The coupling agent may be a sulfur-based coupling agent, an organic peroxide-based coupling agent, an inorganic coupling agent, a polyamine coupling agent, a resin coupling agent, a sulfur compound-based coupling agent, oxime-nitrosamine-based coupling agent, and sulfur, Among these, preferred for a rubber composition for tires is the sulfur-based coupling agent.

In an embodiment, the coupling agent is at least bifunctional. Non-limiting examples of bifunctional coupling agents include organosilanes or polyorganosiloxanes. Other examples of suitable coupling agents include silane polysulfides, referred to as "symmetrical" or "unsymmetrical" depending on their specific structure. Silane polysulphides can be described by the formula (V):

$$Z\text{-}A\text{-}S_x\text{-}A\text{-}Z \quad (V),$$

in which x is an integer from 2 to 8 (preferably from 2 to 5); the A symbols, which are identical or different, represent a divalent hydrocarbon radical (preferably a $C_1$-$C_{18}$ alkylene group or a $C_6$-$C_{12}$ arylene group, more particularly a $C_1$-$C_{10}$, in particular $C_1$-$C_4$, alkylene, especially propylene); the Z symbols, which are identical or different, correspond to one of the three formulae (VI):

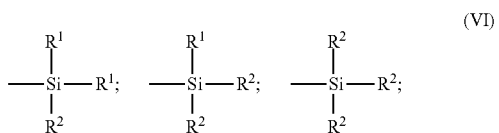

(VI)

in which the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl); the $R^2$ radicals, which are substituted or unsubstituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably still a group selected from $C_1$-$C_4$ alkoxyls, in particular methoxyl and ethoxyl).

Non-limiting examples of silane polysulphides include bis(($C_1$-$C_4$)alkoxy($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Further examples include bis(3-triethoxysilylpropyl)tetrasulphide, abbreviated to TESPT, of formula $[(C_2H_5O)_3Si(CH_2)_3S_2]_2$, or bis(triethoxysilylpropyl)disulphide, abbreviated to TESPD, of formula $[(C_2H_5O)_3Si(CH_2)_3S]_2$. Other examples include bis(mono($C_1$-$C_4$)alkoxyldi($C_1$-$C_4$)alkylsilylpropyl)polysulphides (in particular disulphides, trisulphides or tetrasuiphides), more particularly bis(monoethoxydimethylsilylpropyl)tetrasulphide.

The coupling agent can also be bifunctional POSs (polyorganosiloxanes), or hydroxysilane polysulphides, or silanes or POSs bearing azodicarbonyl functional groups. The coupling agent can also include other silane sulphides, for example, silanes having at least one thiol (—SH) functional group (referred to as mercaptosilanes) and/or at least one masked thiol functional group.

The coupling agent can also include combinations of one or more coupling agents such as those described herein, or otherwise known in the art. A preferred coupling agent comprises alkoxysilane or polysulphurized alkoxysilane. A particularly preferred polysulphurized alkoxysilane is bis(triethoxysilylpropyl) tetrasulphide, which is commercially available by Degussa under the trade name X50S™.

Plasticizer

As used herein, the term "plasticizer" (also referred to as a processing oil), refers to a petroleum derived processing oil and synthetic plasticizer. Such oils are primarily used to improve the processability of the composition. Suitable plasticizers include, but are not limited to, aliphatic acid esters or hydrocarbon plasticizer oils such as paraffinic oils, aromatic oils, naphthenic petroleum oils, and polybutene oils. A particularly preferred plasticizer is naphthenic oil, which is commercially available by Nynas under the trade name NYTEX™ 4700.

MES and TDAE oils are well known to a person skilled in the art; for example, reference is made to publication KGK (Kautschuk Gummi Kunstoffe), 52nd year, No. 12/99, pp. 799-805, entitled "Safe Process Oils for Tires with Low Environmental Impact".

Mention may be made, as examples of MES oils (whether they are of the "extracted" or "hydrotreated" type) or of TDAE oils, for example, of the products sold under the names FLEXON™ 683 by ExxonMobil, VIVATEC™ 200 or VIVATEC™ 500 by H&R European, PLAXOLENE™ MS by Total, or CATENEX™ SNR by Shell.

The resins (it should be remembered that the term "resin" is reserved by definition for a solid compound) formed of $C_5$ fraction/vinylaromatic copolymer, in particular of $C_5$ fraction/styrene or $C_5$ fraction/$C_9$ fraction copolymer, are well known; they have been essentially used to date for application as tackifying agents for adhesives and paints but also as processing aids in tire rubber compositions.

The $C_5$ fraction/vinylaromatic copolymer is, by definition and in a known way, a copolymer of a vinylaromatic monomer and of a $C_5$ fraction.

Styrene, alpha-methylstyrene, ortho-, meta- or para-methylstyrene, vinyltoluene, para-(tert-butyl)styrene, methoxystyrenes, chlorostyrenes, vinylmesitylene, divinylenzene, vinylnaphthalene, indenes, methylindenes, and any vinylaromatic monomer resulting from a $C_9$ fraction (or more generally from a $C_9$ to $C_{10}$ fraction), for example, are suitable as vinylaromatic monomers. Preferably, the vinylaromatic compound is styrene or a vinylaromatic monomer resulting from a $C_9$ fraction (or more generally from a $C_8$ to $C_{10}$ fraction).

In a known way, the term $C_5$ fraction (or, for example, $C_9$ fraction respectively) is understood to mean any fraction resulting from a process resulting from petrochemistry or from the refining of petroleums, any distillation fraction predominantly comprising compounds having 5 (or respectively 9, in the case of a $C_9$ fraction) carbon atoms; the $C_5$ fractions, for example, may comprise, by way of illustration and without limitation, the following compounds, the relative proportions of which may vary according to the process by which they are obtained, for example according to the origin of the naphtha and the steam cracking process: 1,3-butadiene, 1-butene, 2-butenes, 1,2-butadiene, 3-methyl-1-butene, 1,4-pentadiene, 1-pentene, 2-methyl-1-butene, 2-pentenes, isoprene, cyclopentadiene, which can be present in the form of its dicyclopentadiene dimer, piperylenes, cyclopentane, 1-methylcyclopentene, 1-hexene, methylcyclopentadiene or cyclohexene. These fractions may be obtained by any chemical process known in the petroleum industry and petrochemistry. Mention may be made, as nonlimiting examples, of processes for the steam cracking of naphtha or processes for the fluid catalytic cracking of gasolenes, it being possible for these processes to be combined with any possible chemical treatment for the conversion of these fractions known to a person skilled in the art, such as hydrogenation and dehydrogenation.

Preferably, in the $C_5$ fraction/vinylaromatic copolymer (in particular $C_5$ fraction/styrene or $C_5$ fraction/$C_9$ fraction copolymer), the vinylaromatic compound (in particular styrene or $C_9$ fraction) is the minor monomer, expressed as molar fraction. Thus, more preferably, the percentage of aromatic protons (with regard to the total number of protons of the copolymer), determined in a known way by NMR analysis, is less than 50%, more preferably from 1% to 25% (mol %).

Other suitable plasticizers for use in the present invention include "triesters" or "fatty acids." Triester and fatty acid generally refer to a mixture of triesters or a mixture of fatty acids, respectively. The fatty acid preferably consists of more than 50%, more preferably to more than 80% by weight of an unsaturated C18 fatty acid, that is to say one selected from among the group consisting of oleic acid, linoleic acid, linolenic acid and mixtures thereof. More preferably, be it synthetic or natural in origin, the fatty acid used is constituted to more than 50% by weight, more preferably still to more than 80% by weight, of oleic acid.

In other words, very particularly a glycerol trioleate, derived from oleic acid and glycerol, is used. Among the preferred glycerol trioleates, mention will be made in particular, as examples of natural compounds, of the vegetable oils sunflower oil or rapeseed oil having a high content of oleic acid (more than 50%, more preferably more than 80% by weight).

The glycerol triester is used in a preferred amount of between 5 and 80 phr, more preferably of between 10 and 50 phr, in particular within a range from 15 to 30 phr, in particular when the tread of the invention is intended for a passenger-type vehicle. In the light of the present description, the person skilled in the art will be able to adjust this amount of ester as a function of the specific conditions of embodiment of the invention, in particular the amount of inorganic filler used.

Antioxidant

As used herein, the term "antioxidant" refers to a chemical that combats oxidative degradation. Suitable antioxidants include diphenyl-p-phenylenediamine and those disclosed in *The Vanderbilt Rubber Handbook* (1978), Pages 344 to 346. A particularly preferred antioxidant is para-phenylenediamines, which is commercially available by Eastman under the trade name SANTOFLEX™ 6PPD (N-(1,3-Dimethylbutyl)-N'-phenyl-1,4-phenylenediamine).

Crosslinking Agents, Curatives, Cure Packages, and Curing Processes

The elastomeric compositions and the articles made from those compositions are generally manufactured with the aid of at least one cure package, at least one curative, at least one crosslinking agent, and/or undergo a process to cure the elastomeric composition. As used herein, at least one curative package refers to any material or method capable of imparting cured properties to a rubber as is commonly understood in the industry. A preferred agent is sulfur.

Processing

The tire tread composition has many desirable properties when the propylene-ethylene-diene terpolymer is present in the compositions. Also, the maximum Energy Loss (Tangent Delta, wherein the slope is zero) of the immiscible polyolefin domain of the cured composition is preferably a temperature within the range from −30 to 10° C.

The various descriptive elements and numerical ranges disclosed herein for the propylene-ethylene-diene terpolymers, the reactants used to make the propylene-ethylene-diene terpolymers, and their use in tire tread compositions can be combined with other descriptive elements and numerical ranges to describe the invention(s); further, for a given element, any upper numerical limit can be combined with any lower numerical limit described herein. The features of the invention are described in the following non-limiting examples.

EXAMPLES

One propylene-ethylene-diene terpolymer (PEDM) additives (Table 1) were used in tire tread formulations of the following examples.

Preparation of Amorphous Propylene-Based Copolymers

Catalyst system: Catalyst precursor was bis((4-triethylsilyl)phenyl)methylene(cyclopentadienyl) (2,7-di-tert-butylfluoren-9-yl) hafnium dimethyl. However, other metallocene precursors with good diene incorporation and MW capabilities could also be used.

The activator was dimethylanilinium tetrakis(pentafluorophenyl)borate, but dimethylanilinium-tetrakis(heptafluoronaphthyl)borate and other non-coordinating anion type activators or MAO could also be used.

Polymerizations: PEDM (Amorphous)

Polymerization experiments were performed in a continuous stirred tank reactor (CSTR) made by Autoclave Engineers, Erie PA The reactor was designed to operate at a maximum pressure and temperature of 2000 bar (30 kpsi) and 225° C., respectively, although the current experiments the nominal reactor pressures were lower, from 1600 to 1700 psig. The nominal reactor vessel volume was 150 mL. The working volume was smaller, approximately 120 mL, due to the stirrer. The reactor was equipped with a magnetically coupled external stirrer (Magnedrive). A pressure transducer measured the pressure in the reactor. The reactor temperature was measured using a type-K thermocouple. A flush-mounted rupture disk located on the side of the reactor provided protection against catastrophic pressure failure. All product lines were heated to ~120° C. to prevent fouling. The reactor had an electric heating hand that was controlled by a programmable logic control device (PLC). Except for the heat losses to the environment, the reactor did not have cooling (semi-adiabatic operations).

The conversion in the reactor was monitored by an on-line gas chromatograph (GC) that sampled both the feed and the effluent. The GC analysis utilized the propane impurity present in the propylene feed as internal standard. The reactor temperature and the temperature difference across the reactor wall was maintained constant by adjusting the reactor heater output (skin temperature) and the catalyst feed rate. The target reactor temperature was maintained at 0.5-3 mol ppm catalyst concentrations in the feed. At these low catalyst concentrations, impurity control was the most critical factor in achieving controlled, steady state reactor conditions. Feed purification traps were used to control impurities carried by the monomer feed. The purification traps were placed right before the feed pumps and comprised of two separate beds in series: activated copper (reduced in flowing $H_2$ at 225° C. and 1 bar) for $O_2$ removal followed by a molecular sieve (5A, activated in flowing $N_2$ at 270° C.) for water removal.

Propylene was fed from a low-pressure cylinder equipped with a dip leg for liquid delivery to the reactor. A heating blanket (Ace) was used to increase the propylene cylinder head pressure to 17 bar (~250 psig). This increased head pressure allowed the monomer to be delivered to the monomer feed pump head at a pressure above its bubble point at the pump. The low-pressure monomer feed was also stabilized against bubble formation by cooling the pump head using 10° C. chilled water. The purified monomer feed was fed by a two-barrel continuous ISCO pump (model 500D). The monomer flow rate was adjusted by adjusting the motor speed of the pump and was measured by a Coriolis mass flow meter (Model PROline Promass 80, Endress and Hauser).

The catalyst feed solution was prepared inside an argon-filled dry box (Vacuum Atmospheres). The atmosphere in the glove box was purified to maintain <1 ppm $O_2$ and <1 ppm water. All glassware was oven-dried for a minimum of 4 hours at 110° C. and transferred hot to the antechamber of the dry box. Stock solutions of the catalyst precursor and the activator were prepared using purified toluene that was stored in amber bottles inside the dry box. Aliquots were taken to prepare fresh activated catalyst solutions. The activated catalyst solution was charged inside the argon-filled dry box to a heavy-walled glass reservoir (Ace Glass, Inc. Vineland, NJ) and was pressurized to 5 psig with argon. The activated catalyst solution was delivered to the unit by a custom made two-barrel continuous high-pressure syringe pump (PDC Machines).

HPLC grade hexane (95% n-hexane, J.T. Baker) was used as solvent. It was purged with Argon for a minimum of four hours and was filtered once over activated basic alumina. The filtered hexane was stored in a 4-liter glass vessel (Ace Glass, Vineland, NJ) inside an argon-filled dry box. The hexane was further purified by adding 1.5 mL (1.05 g) of trioctylaluminum (Aldrich #38,655-3) to the 4-liter reservoir of filtered hexane. 5-10 psig head pressure of argon was applied to the glass vessel to deliver the scavenger solution to a metal feed vessel from which the hexane was delivered to the reactor by a two-barrel continuous ISCO pump (model 500D).

Ethylidene norbornene (ENB) was purified by filtering through activated basic alumina. The filtered ENB was stored in a 4-liter glass vessel (Ace Glass, Vineland, NJ) inside an argon-filled dry box. 5-10 psig head pressure of argon was applied to the glass vessel to deliver the scavenger solution to a 500 mL single-barrel ISCO pump, which in turn fed diene to the reactor.

Polymerization grade ethylene was compressed by a Fluitron A %-200 compressor and metered by a mass flow meter into the reactor.

During a polymerization experiment, the reactor was preheated to ~10-15° C. below that of the desired reaction temperature. Once the reactor reached the preheat temperature, the solvent pump was turned on to deliver hexane/trioctyl aluminum scavenger solution to the reactor from the 4-liter scavenger solution feed vessel. This stream of scavenger/catalyst solution entered the reactor through a port on the top of the stirrer assembly to keep the polymer from fouling the stirrer drive. After the flow of solvent to the reactor was verified by monitoring the amount of solvent taken from the feed vessel, the monomer feeds were turned on. The monomers were fed to the reactor through a side port. The reactor was purged when the pressure increased to ~100 bar (~1.5 kpsi) by opening each valve briefly. This reduced the pressure in the reactor and verified that all ports in the reactor were operational. After all valves had been tested and the reactor reached the desired reaction pressure, the syringe pump containing the activated catalyst solution was pressurized. When the syringe pump pressure exceeded the reactor pressure by 27 bar (~400 psi) an air actuated solenoid valve was opened to allow the catalyst solution to mix with the stream of flowing solvent upstream of the reactor. The arrival of the catalyst to the reactor was indicated by an increase in the reaction temperature caused by the exothermic polymerization reaction. During the line-out period, the catalyst feed rate was adjusted to reach and maintain the target reaction temperature and conversion. The products were collected and weighed after vacuum-drying overnight at 70° C. Aliquots of the product were used for characterization without homogenizing the entire product yield.

The ENB contents were determined using a Nicolet 6700 FTIR with Omnic 7.1 software following the ASTM D6047-99.

Melt Index (MI) of polymers was determined by using Dynisco Kayeness Polymer Test Systems Series 4003 apparatus following ASTM D1238-13 and ISO 1133-1:2011 methods. The protocol for the measurement is described in the Series 4000 Melt indexer Operation manual, Method B.

The $C_2$ contents were determined by using a Fourier transform infrared spectrophotometer (FTIR), extension of the existing methods described in ASTM D3900-17. The ethylene content is determined by measuring the area of the infrared absorbance of the propylene methyl wag centered between 1155 cm-1 and 1166 cm-1 and of the methylene rocking band centered between 722 cm-1 and 732 cm-1. The propylene base points are determined by finding the minimum absorbance value between 1245 cm-1 and the propylene peak and between 1110 cm-1 and the propylene peak. If no minimum is found the end point of 1245 or 1110 cm-1 is used. The ethylene base points are determined by finding the minimum absorbance value between 785 cm-1 and the ethylene peak and between 675 cm-1 and the ethylene peak. If no minimum is found the end point of 785 or 675 cm-1 is used.

The ratio of these areas (APropyl/AEthyl)=AR is calculated and then correlated to the mass fraction of ethylene by calibrating the instrument with well-characterized propylene-ethylene copolymers standards.

During the development of this method, the best fit of the experimental data was obtained by using an expression of the above ratio [AR/(AR+1)] and by correlation with the ethylene content of the standards via a quadratic least square regression.

TABLE 1

PEDM formulations

| $C_3$ (wt %) | $C_2$ (wt %) | ENB (wt %) | MFR (g/10 min) |
|---|---|---|---|
| 86.6 | 9.5 | 3.9 | 0.56 |

Sample Preparation of Compounds

Additive mixing: PEDM Compound composition is listed in Tables 2, respectively. All components are listed in phr, or part per hundred, of polymer unit. These compounds were mixed in suitable mixers, using at least two successive passes well known to the person skilled in the art. The mixing temperatures range between 110° C. and 210° C. The duration of the mixing for each of the individual mixing steps is between 1 and 30 minutes depending on desired property.

TABLE 2

PEDM Compound formulation

| Component* | Amount (phr**) |
|---|---|
| PEDM | 100 |
| VULCAN ® 1380 | 8 |
| CHIMASSORB ® 2020 | 0.8 |
| Sulfur | 2.5 |
| Stearic acid | 1 |
| Zinc oxide | 1 |

*VULCAN ® 1380 (0.38 mm carbon black, available from Cabot Corporation); CHIMASSORB ® 2020 (high-molecular-weight, hindered amine light stabilizer, available from BASF)
**parts by weight per hundred parts of total PEDM Silica Tread Compounding Tread compound formulations for the controls and examples are listed in Table 3. All components are listed in phr, or part per hundred, of polymer unit. These compounds were mixed in suitable mixers, using at least two successive passes well known to the person skilled in the art. The non-productive passes (mixing without crosslinking system) which have mixing at high temperatures between 110° C. and 190° C. The non-productive passes are followed by a productive pass where the crosslinking system is added. The temperature for this mixing is typically below 110° C.

TABLE 3

Tire tread formulations using PERM Compound and corresponding controls

| Component* | TT-3** | TT-4** | TT-5** | TT-6** |
|---|---|---|---|---|
| Non-Productive Pass Components | | | | |
| SPRINTAN ® SLR-4602 | 90.5 | 90.5 | | |
| ZEOSIL ® 1165MP | 63 | 63 | 63 | 63 |
| BUDENE ® 1280 | 9.5 | 9.5 | | |
| BUNA ® VSL 4526-0 | | | 89 | 89 |
| VULCAN ® 1380 | | | | |
| NYTEX ® 4700 | 13.9 | 13.9 | 13.9 | 13.9 |

TABLE 3-continued

Tire tread formulations using PERM Compound and corresponding controls

| Component* | TT-3** | TT-4** | TT-5** | TT-6** |
|---|---|---|---|---|
| BUNA ® CB 24 | | | 11 | 11 |
| SANTOFLEX ™ 6PPD | 2 | 2 | 2 | 2 |
| X 266S ® | 10 | 10 | 10 | 10 |
| Stearic acid | 2.5 | 2.5 | 2.5 | 2.5 |
| PEDM 1 Compound | | 15 | | 15 |
| Productive Pass Components | | | | |
| Zinc oxide | 2 | 2 | 2 | 2 |
| CBS | 1.19 | 1.19 | 1.7 | 1.7 |
| Sulfur | 1.4 | 1.4 | 1 | 1 |
| DPG | 1.4 | 1.4 | 0.5 | 0.5 |

*SPRINTAN ® SLR-4602 (solution styrene butadiene rubber (S-SBR), available from Styron); ZEOSIL ® 1165MP (amorphous precipitated silica, available from Rhodia); BUDENE ® 1280 (high-cis polybutadiene, available from Goodyear Chemical); BUNA ® VSL 4526-0 (solution styrene butadiene rubber (S-SBR), available from Arlanxeo); VULCAN ® 1380 (0.38 mm carbon black, available from Cabot Corporation); NYTEX ® 4700 (a high viscosity naphthenic black oil, available from Nynas AB); BUNA ® CB 24 (neodymium butadiene rubber, available from Arlanxeo); SANTOFLEX ™ 6PPD (N-(1,3-Dimethylbutyl)-N'-phenyl-p-phenylenediamine, available from Eastman Chemical); X 266S ® (bis(triethoxysilylpropyl)polysulfide with carbon black, available from Evonik Industries); N-cyclohexyl-2-benzothiazylsulfenamide (CBS); diphenyl guanidine (DPG)
**parts by weight per hundred parts of total rubber (SPRINTAN ® SLR-4602 + BUDENE ® 1280 + BUNA ® VSL 4526-0 + BUNA ® CB 24)

Loss Tangent Measurements

The compounds listed in Table 3 were compression molded and cured into pads. Afterward, a rectangular test specimen (12 mm wide & 30 mm long) was died out of the cured pads and mounted in an ARES G2 (Advanced Rheometric Expansion System, TA instruments) for dynamic mechanical testing in torsion rectangular geometry. Though the thickness of the test specimen was around 1.8 mm, the thickness of the specimens varied and was measured manually for each test. A strain sweep at room temperature up to 5.5% strains and at 10 Hz was conducted first followed by a temperature sweep at 4% strain and 10 Hz from −26° C. to 100° C. at 2° C./min ramp rates. Storage and loss moduli were measured along with the loss tangent values. For better wet traction, it is preferred to have higher loss tangent values at temperatures below 0° C. whereas the loss tangent is preferred to be lower at 40° C. for better rolling resistance. The temperature at which the maximum tan delta occurred was recorded as the glass transition temperature, Tg.

Table 4 provides the loss tangent measurements for the tire tread formulations using PEDM Compound (Table 3), and Table 5 provides the same measurements but as a percentage of the corresponding control tire tread formulation TT-3 for TT-4, and TT-5 for TT-6.

TABLE 4

Loss tangent (Δtangent) for tire tread formulations using PEDM Compound

| Temperature (° C.) | TT-3 | TT-4 | TT-5 | TT-6 |
|---|---|---|---|---|
| 0 | 0.613 | 0.702 | 0.617 | 0.701 |
| 40 | 0.153 | 0.137 | 0.208 | 0.188 |
| Tg° C | −16 | −16 | −16 | −12 |

TABLE 5

Loss tangent (percent of TT-3) for tire tread formulations using PEDM Compound

| Temperature (° C.) | TT-3 | TT-4 | TT-5 | TT-6 |
|---|---|---|---|---|
| 0 | 100 | 115 | 100 | 114 |
| 40 | 100 | 90 | 100 | 90 |

The addition of PEDM to the tread compound, as compared to the corresponding control, improves wet traction (increased loss tangent at 0° C.) and improves roll resistance (decreased loss tangent at 40° C.).

Stress/Strain Measurements

Five test specimens were dies out with ASTM D4482 die and conditioned in the lab for 16 hours before testing.

Specimens were tested on an Instron 5565 with a long travel mechanical extensometer.

The load cell and extensometer are calibrated before each day of testing with 20 mm as the gauge length.

Sample information, operator name, date, lab temperature, and humidity were all recorded.

Specimen thickness was measured at three places in the test area and the average value was entered when prompted. The lab temperature and humidity were measured.

Specimen was carefully loaded in the grips to ensure grips clamp on the specimen symmetrically. The extensometer grips was then attached to the sample in the test area.

The test was prompted to start. A pre-load of 0.1N was applied. Testing began with the crosshead moving at 20 inches/minute until a break is detected.

5 specimens from each sample were tested and the median values were reported.

Table 6 provides the stress/strain measurements for the tire tread formulations using PEDM 1 Compound (Table 3).

TABLE 6

Stress/strain measurements for tire tread formulations using PEDM Compound

| Property | TT-3 | TT-4 | TT-5 | TT-6 |
|---|---|---|---|---|
| 50% Modulus (MPa) | 1.938 | 1.837 | 1.908 | 1.715 |
| 100% Modulus (MPa) | 3.13 | 3.089 | 2.902 | 2.624 |
| 200% Modulus (MPa) | 7.067 | 7.156 | 5.777 | 5.269 |
| Tensile Strength (MPa) | 7.61 | 8.15 | 8.47 | 8.18 |
| Elongation (%) | 210.8 | 216.9 | 274.3 | 279.3 |

The addition of PEDM to the tread formulations does not impact the physical properties which indicates equivalent wear performance.

In the specification and in the claims, the terms "including" and "comprising" are open-ended terms and should be interpreted to mean "including, but not limited to". These terms encompass the more restrictive terms "consisting essentially or and consisting of."

It must be noted that as used herein and in the appended claims, the singular forms "a", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

The invention claimed is:

1. An elastomeric composition comprising, per 100 parts by weight of rubber (phr):
    about 0 to about 25 phr of a polybutadiene having a cis-1,4 linkage content of at least 95%;
    about 75 to 100 phr of a styrene/butadiene copolymer;
    about 10 to about 30 phr of a processing oil;
    about 50 to about 70 phr of a filler;
    about 5 to about 80 phr of a glycerol trioleate;
    a curative agent;
    an antioxidant;
    a silane coupling agent; and
    about 5 to about 25 phr of a propylene-ethylene-diene terpolymer;
    wherein the propylene-ethylene-diene terpolymer contains from about 8 wt % to about 12 wt % ethylene based on the terpolymer; and
    wherein the melt flow rate (MFR) at 2.16 kg weight at 230° C. of the propylene-ethylene-diene terpolymer is from about 0.5 to about 2 g/10 min.

2. The elastomeric composition of claim 1, wherein the elastomeric composition has a glass transition temperature of between −25° C. and 0° C.

3. The elastomeric composition of claim 1, wherein the filler is a silica-based filler.

4. The elastomeric composition of claim 1, wherein the filler is a carbon black filler.

5. The elastomeric composition of claim 1, wherein the filler is blend of a silica-based filler and a carbon black filler.

6. The elastomeric composition of claim 1, wherein the propylene-ethylene-diene terpolymer is present in the amount of about 10 phr to about 20 phr.

7. The elastomeric composition of claim 1, wherein the propylene-ethylene-diene terpolymer contains from about 1 wt % to about 8 wt % ethylidene norbornene based on the propylene-ethylene-diene terpolymer.

8. The elastomeric composition of claim 1, wherein the propylene-ethylene-diene terpolymer contains from about 2 wt % to about 6 wt % ethylidene norbornene based on the propylene-ethylene-diene terpolymer.

9. The elastomeric composition of claim 1, wherein the propylene-ethylene-diene terpolymer contains from about 3 wt % to about 5 wt % ethylidene norbornene based on the propylene-ethylene-diene terpolymer.

10. The elastomeric composition of claim 1, wherein the propylene-ethylene-diene terpolymer contains from about 72 wt % to about 95 wt % propylene based on the propylene-ethylene-diene terpolymer.

11. The elastomeric composition of claim 1, wherein the propylene-ethylene-diene terpolymer contains from about 80 wt % to about 93 wt % propylene based on the propylene-ethylene-diene terpolymer.

12. The elastomeric composition of claim 1, wherein the propylene-ethylene-diene terpolymer contains from about 85 wt % to about 89 wt % propylene based on the propylene-ethylene-diene terpolymer.

13. The elastomeric composition of claim 1, wherein a glass transition temperature (Tg) of the propylene-ethylene-diene terpolymer is from about 20° C. to about −60° C.

14. A tire tread composition comprising the elastomeric composition of claim 1.

15. An article comprising the tire tread composition of claim 14.

16. A method of making the elastomeric composition of claim 1, comprising the steps of:
    (a) blending 0 to 25 phr of the polybutadiene, 75 to 100 phr of the styrene/butadiene copolymer, 50 to 70 phr of the filler, 10 to 30 phr of the processing oil, 5 to 80 phr of the glycerol trioleate, the curative agent, the antioxidant, the silane coupling agent, and 5 to 25 phr of the propylene-ethylene-diene terpolymer to form a first component at a temperature in the range from about 110° C. to about 200° C.;

(b) blending the curative agent with the first component at a temperature in the range of about less than 110° C.; and (c) recovering the elastomeric composition.

17. A method of balancing the wet traction performance and rolling resistance in a tire tread comprising the elastomeric composition of claim 1:

combining 50 to 70 phr of the filler, 0 to 25 phr of the polybutadiene, 75 to 100 phr of the styrene/butadiene copolymer, 10 to about 30 phr of the processing oil, 5 to 80 phr of the glycerol trioleate, the antioxidant, the silane coupling agent, and the curative agent with 5 to 40 phr of one or more of the propylene-ethylene-diene terpolymer to form the tire tread; and effecting a cure of the components to form a tire tread, wherein the level of the propylene-ethylene-diene terpolymer(s) relative to the other components, and its comonomer content, can be varied to improve the balance of wet traction and rolling resistance of a tire tread.

18. The elastomeric composition of claim 1, wherein the glycerol trioleate is sunflower oil.

19. The elastomeric composition of claim 1, comprising about 10 to 50 phr of the glycerol trioleate.

20. The elastomeric composition of claim 1, comprising about 15 to 30 phr of the glycerol trioleate.

* * * * *